March 4, 1924. 1,485,564
L. MELANOWSKI
CAST METAL WHEEL
Filed April 23, 1920
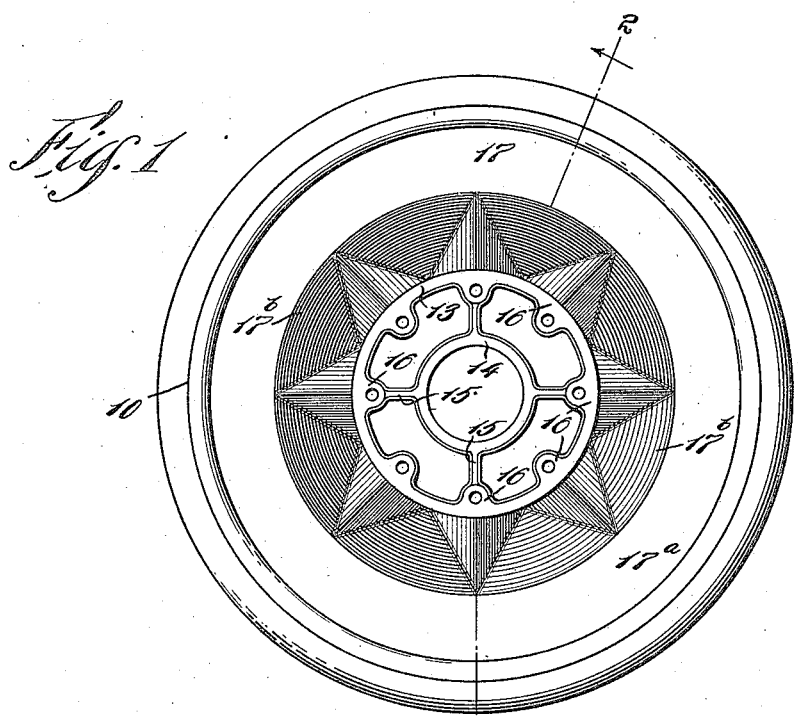
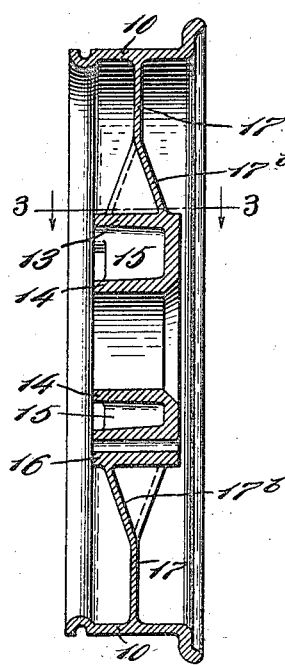
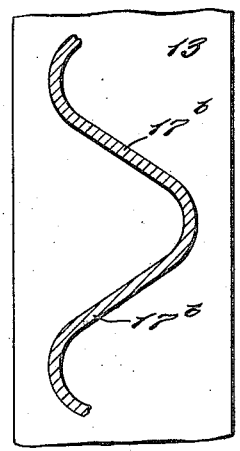

Patented Mar. 4, 1924.

1,485,564

UNITED STATES PATENT OFFICE.

LEO MELANOWSKI, OF CLEVELAND, OHIO, ASSIGNOR OF ONE-THIRD TO WARREN H. COWDERY AND ONE-THIRD TO GEORGE B. DURELL, BOTH OF CLEVELAND, OHIO.

CAST-METAL WHEEL.

Application filed April 23, 1920. Serial No. 375,956.

*To all whom it may concern:*

Be it known that I, LEO MELANOWSKI, a citizen of the Republic of France, residing at Cleveland, in the county of Cuyahoga and State of Ohio, have invented a certain new and useful Improvement in Cast-Metal Wheels, of which the following is a full, clear, and exact description, reference being had to the accompanying drawings.

This invention relates generally to wheels and more particularly to a cast metal wheel intended for use in connection with motor vehicles of every description and it has for its object to provide a cast metal wheel which shall be exceedingly light and at the same time strong and durable. Another object of the invention is to provide a cast metal wheel of such construction that the use of cores can be dispensed with and metal molds employed if so desired; and a still further object is to provide a cast metal wheel of such a nature that aluminum, malleable iron or any other suitable metals may be employed as the casting material.

With these objects in view and certain others which will become apparent as the description proceeds, the invention consists in the details of construction hereinafter fully described and set forth in the appended claims.

In the drawings forming a part of this specification, Fig. 1 is a face view of a cast metal wheel embodying my invention; Fig. 2 is a sectional view taken on the line 2—2 of Fig. 1; and Fig. 3 is a detail sectional view on the line 3—3 of Fig. 2.

In making a wheel in accordance with my invention, I provide a hub, a periphery and a connecting web, all integral and preferably cast from aluminum although it will be understood that any other suitable metal may be employed. In practice it is proposed to make the felly and web as thin and light as possible consistent with good molding practice and having due regard to the loads the wheels are intended to carry and the lateral stresses and strains they are intended to withstand. The periphery 10 may be shaped to receive the usual form of detachable tire retaining ring (not shown). The intervening space constitutes the rim base upon which the tire rests. In case it is desired to use a demountable tire carrying rim in connection with my improved construction of cast metal wheel, the peripheral portion will have its exterior shaped substantially the same as the usual commercial felly bands now in use and any suitable form of fastening means employed to secure the demountable tire carrying rim upon the fixed rim or felly. The hub is made as light as possible and with this object in view is preferably composed of an outer ring 13, an inner ring 14 and a plurality of radial connecting ribs 15; and where the ribs 15 meet the outer ring 13, I may provide bosses or enlargements 16 which are bored to receive bolts for connecting the hub flanges and brake drums to the cast metal hub.

The hub and periphery are connected by an integral web 17 which is partly flat and partly corrugated or fluted, the outer portion 17ª being flat and the inner portion 17ᵇ being corrugated and it will be noted that the corrugations are preferably along radial lines and also that one angle or apex is upon the inner side of the wheel while the next one is upon the outer side of the wheel thereby placing the angles alternately. The outer or flat portion of the web is preferably arranged centrally of the periphery or tire base but this arrangement may be varied to either side if desired. It will also be noted that the peripheral portion is slightly wider than the hub portion thereby providing an ample rim base for the tire without increasing the weight of the wheel body as a whole. The web as a whole may be of uniform thickness throughout or it may be thickest at the hub portion and gradually diminishing toward the periphery. By making the wheel as herein shown and described, I provide an exceedingly strong and durable cast metal wheel and at the same time maintain the weight thereof at the lowest possible point and owing to the peculiar formation of the web, the wheel will radially clear itself of mud and dirt to a remarkable degree.

Having thus described my invention, what I claim is:—

A cast metal automobile wheel comprising a hub portion, a peripheral portion having tire retaining flanges, and a connecting web portion, the outer portion of said web being flat, the inner portion of said web being corrugated or fluted along radial lines, said peripheral portion being wider than the hub portion.

In testimony whereof, I hereunto affix my signature.

LEO MELANOWSKI.